United States Patent [19]

Jackson

[11] 3,991,245
[45] Nov. 9, 1976

[54] FLEXIBLE HONEYCOMB STRUCTURE
[75] Inventor: Wendell T. Jackson, Walnut Creek, Calif.
[73] Assignee: Hexcel Corporation, Dublin, Calif.
[22] Filed: Sept. 18, 1974
[21] Appl. No.: 507,102

[52] U.S. Cl. ............................ 428/116; 156/205; 428/118; 428/398
[51] Int. Cl.² ............................................ B32B 3/12
[58] Field of Search ........................... 161/68, 69; 52/615, 618; 29/455 LM; 156/197, 205; 428/72, 73, 116, 117, 118, 119, 120, 398

[56] References Cited
UNITED STATES PATENTS

| | | | |
|---|---|---|---|
| 2,848,132 | 8/1958 | Davous | 217/23 |
| 3,018,205 | 1/1962 | Barut | 161/68 |
| 3,070,198 | 12/1962 | Haskell | 29/455 LM |
| 3,227,600 | 1/1966 | Holland | 161/68 |
| 3,356,555 | 12/1967 | Jackson | 156/205 |
| 3,432,379 | 3/1969 | Anderson | 161/68 |
| 3,501,367 | 3/1970 | Parker | 161/68 |
| 3,616,141 | 10/1971 | Anderson | 161/68 |
| 3,673,058 | 6/1972 | Jackson et al. | 161/68 |

Primary Examiner—Harold Ansher
Assistant Examiner—Henry F. Epstein
Attorney, Agent, or Firm—Townsend and Townsend

[57] ABSTRACT

A flexible honeycomb structure formable into a non-planar contour comprising a cellular web of thin sheet material is disclosed. The cells in the web each have a cross section comprising three substantially congruent segments equally angularly disposed about a common center. Each such segment includes a non-linear portion intermediate to its ends, and is preferably in the shape of four contiguous sides of a hexagonal configuration for easy nesting of the cells. The present invention also provides alternate methods for forming the flexible honeycomb structure.

10 Claims, 8 Drawing Figures

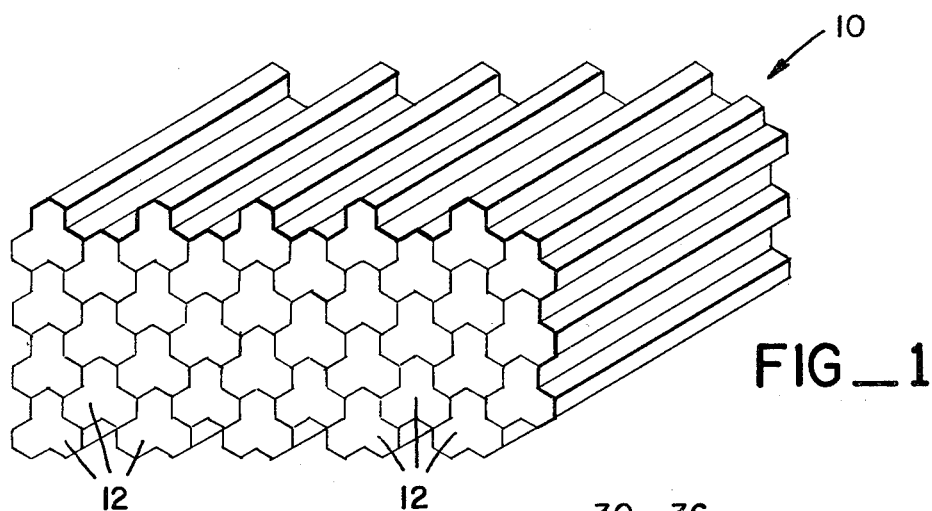
FIG_1
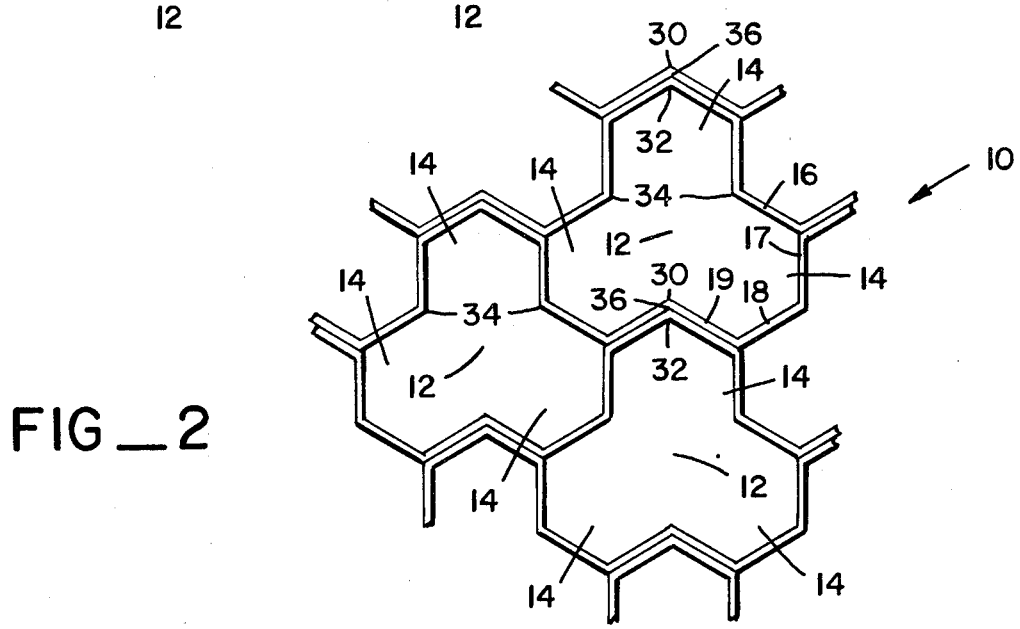
FIG_2
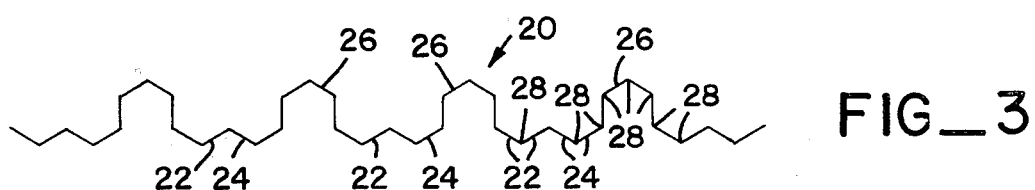
FIG_3
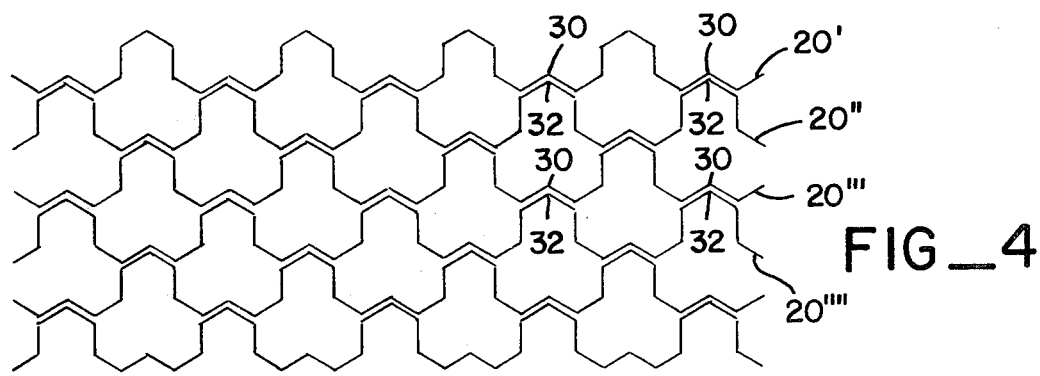
FIG_4

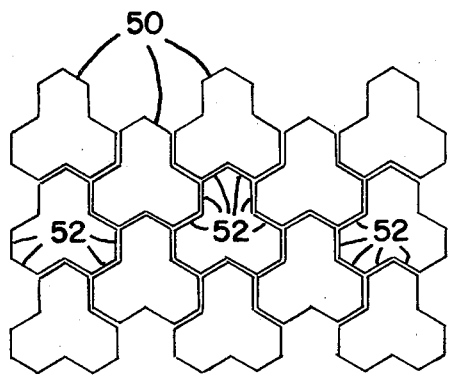
FIG_5
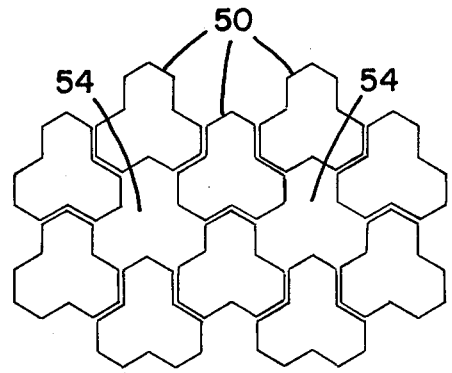
FIG_6
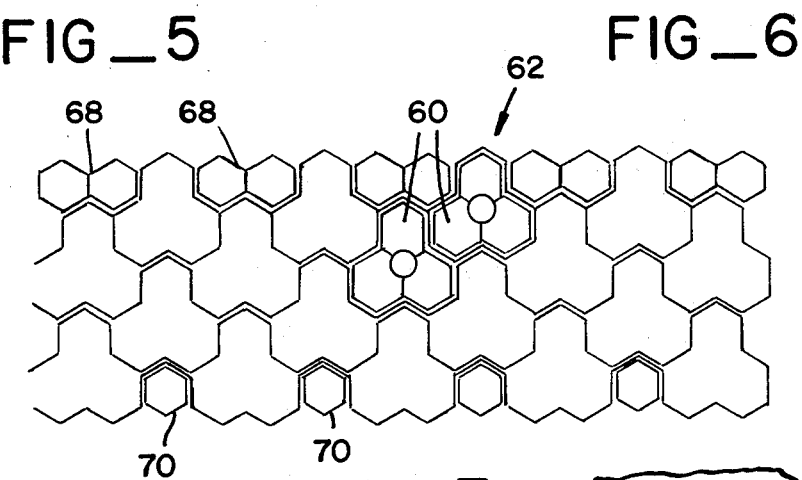
FIG_7
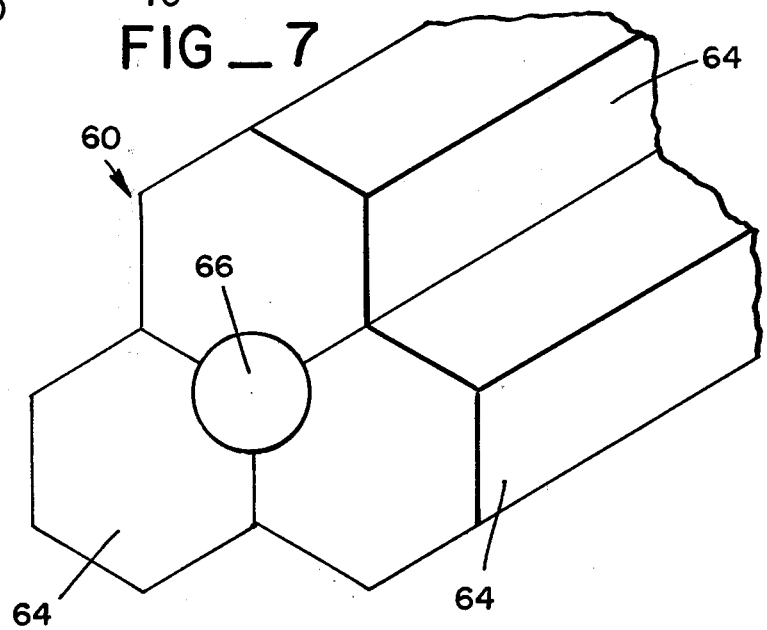
FIG_8

FLEXIBLE HONEYCOMB STRUCTURE

BACKGROUND OF THE INVENTION

The present invention relates to honeycomb materials, and in particular to a flexible honeycomb structure formable into various non-planar shapes.

The anticlastic properties of standard hexagonal honeycomb and the difficulty of forming such honeycomb into curved or other non-planar shapes is well known. In order to provide a honeycomb structure which can be formed into such non-planar configurations, it has been found necessary to provide the cell walls with excess length by including a curve or corner into the walls. Different types of formable honeycomb are illustrated in the patent to Holland, U.S. Pat. No. 3,227,600 and the patent to Anderson, U.S. Pat. No. 3,616,141, each assigned to the assignee of the present case. However, known methods for designing such a curve into the walls of the honeycomb cells, particularly when graphite yarn laminate is used as the honeycomb material, produces a honeycomb having assymetric cells, unlike standard hexagonal honeycomb, and is desirable to match the characteristics of standard honeycomb with a flexible honeycomb structure.

SUMMARY OF THE INVENTION

The present invention provides a flexible honeycomb structure having a symmetric cellular web of thin sheet material such as graphite yarn laminate. The cells of the web each have a cross section comprising at least three substantially congruent segments equally angularly disposed about a common center. Each segment includes a non-linear portion intermediate to its ends to give flexibility to the structure. The segments are preferably in the shape of four contiguous sides of a hexagonal configuration so that the cells easily nest together.

The flexible honeycomb structure is half-pitch bonded as in standard honeycomb. Since the structure is symmetric, it is more nearly isotropic in shear than previous formable honeycomb structure. Also, the walls of the cellular structure appear to be more stable so that the compression strength is improved.

To form the flexible honeycomb structure of the present invention, it is preferred that a plurality of layers of specially constructed rods are utilized. Each rod includes three radial segments equally angularly disposed about a common axis. The cross section of each segment preferably comprises four contiguous sides of a regular hexagonal configuration. Thin sheet material such as graphite yarn laminate is disposed about the outer surfaces of the rods and is bonded together to form the cellular web. The cross sectional configuration of the cells of the resulting honeycomb conform to that of the outer surface of the rods. After the cellular web has been formed, the rods are removed, leaving a flexible honeycomb structure.

The sheet material used to form the honeycomb can comprise either a plurality of strips of sheet material which are disposed between the layers of rods, or can comprise pultruded or otherwise formed tubular segments of the material. Such pultruded segments are formed by a process similar to extrusion with added force exerted to pull the material from the mold. When the strips of sheet material are used, the strips can either be pre-cured and then bonded to the other strips, or can be cured after having been formed into the web so that the sheets of material are integrally bonded. When pultruded tubular elements of sheet material are used, they can either be densely or sparsely stacked to form various densities of honeycomb material.

One of the advantages of the honeycomb structure of the present invention is that increased shear strengths are realized in both the length L and width W directions. The web has a corrugated double wall in the L direction increasing shear strength in that direction. Part of the web is parallel to the W direction increasing the shear strength in that direction. Hence, a honeycomb structure is provided which can easily be formed into various shapes but still has symmetric cells as does standard honeycomb, and in addition the strength properties of the honeycomb are improved.

The novel features which are characteristic of the invention, as to organization and method of operation, together with further objects and advantages thereof will be better understood from the following description considered in connection with the accompanied drawings in which preferred embodiments of the invention are illustrated by way of example. It is to be expressely understood, however, that the drawings are for the purpose of illustration and description only and are not intended as a definition of the limits of the invention.

BRIEF DESCRIPTION OF THE DRAWINGS

FIG. 1 is a perspective view of a flexible honeycomb block formed according to the teachings of the present invention;

FIG. 2 is an enlarged end view of a portion of the honeycomb block illustrated in FIG. 1;

FIG. 3 is a schematic view illustratting a corrugated sheet formed in accordance with one embodiment of the present invention;

FIG. 4 is a schematic end view showing the stacking of a plurality of corrugated sheets according to the embodiment of the present invention shown in FIG. 3;

FIG. 5 is a schematic end view illustrating the formation of a dense honeycomb according to a second embodiment of the present invention;

FIG. 6 is a schematic end view of a low-density honeycomb formed according to the second embodiment of the present invention;

FIG. 7 is a schematic end view illustrating the use of the support rods of the present invention in forming the cellular honeycomb block;

FIG. 8 is an enlarged fragmentary perspective view of one of the rods illustrated in FIG. 7.

DESCRIPTION OF THE PREFERRED EMBODIMENTS

A flexible honeycomb block 10 formed according to the teachings of the present invention is illustrated by way of reference to the schematic view of FIG. 1 and the enlarged view of FIG. 2. Block 10 includes a plurality of cells 12 formed with thin sheet material. The present invention is primarily adapted for use with extremely thin fragile fabrics such as graphite yarn laminate, but other sheet materials such as papers, foils, films and mats can be employed as well. Each cell 12 includes three inwardly opening congruent segments 14 equally angularly disposed about a common center. The segments are congruent in that they are superposed one over the other so that they are coincident throughout. The segments 14 each comprise four sides, such as 16–19, in the configuration of four contiguous sides of a hexagon. The cells 12 each have a generally star-shaped cross section having three points around a hollow center.

One of the methods of forming flexible honeycomb block 10 is illustrated by way of reference to FIGS. 2–4 in combination. First, a strip 20 of thin sheet material is corrugated as illustrated in FIG. 3. After corrugation, sheet 20 comprises a cyclic arrangement of contiguous two-sided upwardly opening segments 22, 24 joined to a four-sided downwardly opening segment 26. Sheet 20 thus includes a plurality of zeniths 30 at the junctures between the two-sided segments 22, 24. Also, a plurality of zeniths 32 are formed in strip 20 at the junctures of the four-sided segments 26. (The terms "upwardly," "downwardly" and "zenity" are used herein and in the claims in a relative sense for convenience and are not used to denote direction from vertical.) The included angles such as 28 between each of the sides of corrugated sheets 20 all equal approximately 120°.

Referring next to FIG. 4, corrugated strips such as 20', 20'', 20''', 20'''' are stacked one on top of the other to form a cellular web of sheet material. Each corrugated strip 20' – 20'''' is offset from the next underlying strip so that zenith 30 formed by the intersection between the contiguous two-sided segments 22, 24 overlies zenith 32 in the four-sided segment 26 in the next underlying corrugated strip. Thus, when corrugated strips 20' – 20'''' are overlaid as illustrated in FIG. 4, a cellular web is formed by the strips of material which can be bonded to form the block 10 of flexible honeycomb material illustrated in FIG. 1.

If relatively rigid sheet material is used to form the cellular web illustrated in FIG. 4, strips 20 can simply be bonded together using an adhesive adjacent zenith 30 and 32 of the strips. If graphite yarn laminate is to be used as the sheet material which is relatively fragile, the material is ordinarily encapsulated in aluminum foil before it is formed to the desired shape. The sheet material is corrugated in the aluminum foil capsule, after which it can be cured and decapsulated. The adhesive is then applied to the sheet material at the zeniths 30, 32 and the sheet material is stacked as illustrated in FIG. 4. As an alternative, the encapsulated corrugated sheet material can be decapsulated prior to curing and stacked as illustrated in FIG. 4. The stacked strips 20 of sheet material are then cured to integrally bond the strips together and form the desired honeycomb.

As is evident from FIG. 2, the intersection between the various segments 14 of each cell 12 from a non-linear junction 34. Non-linear junctions 34 provide flexibility to honeycomb block 10 so that it can easily be formed into non-planar configurations. Furthermore, non-linear corners 36 are provided at the point where zeniths 30 and 32 are interconnected. Corners 36 also provide a certain amount of flexibility to the structure, but the flexibility from these corners is limited due to the fact that a double-wall thickness is formed at corners 36 whereas non-linear junctions 34 have only a single-wall thickness.

A second embodiment of the method used to form honeycomb block 10 is illustrated by way of reference to FIGS. 5 and 6. A plurality of tubular elements 50 of thin sheet material are pultruded, cured if applicable, and stacked into a cellular web. If a relatively dense honeycomb is desired, tubular elements 50 are stacked as illustrated in FIG. 5 so that each wall 52 of the structure has a double-wall thickness. If a less dense honeycomb is desired, tubular elements 50 are stacked as illustrated in FIG. 6 where various positions 54 in the structure are left blank. The resulting honeycomb formed has the same general configuration as that illustrated in FIG. 5, with the exception that the cellular walls surrounding vacant positions 54 have only a single-wall thickness while the other walls have double thickness.

If relatively fragile material such as graphite yarn laminate is to be used to form the honeycomb, the corrugated configuration of the sheet material must ordinarily be supported and maintained as the honeycomb block is formed from the cellular web. To accomplish this objective, a plurality of specially shaped rods 60, as illustrated in detail in FIG. 8, are placed in the cells formed in cellular web 62 (see FIG. 7). The outer surface of rods 60 each conform to the shape of the cells formed in web 62, i.e., comprise three congruent segments 64 equally angularly disposed about a common center. Each segment 64 is in the shape of a generally hexagonal member attached at one corner to a central bar 66. Hexagonal members 64 can be silver-soldered or otherwise affixed to central bar 66 to form the desired shape.

To maintain the shape of the upper edges of cellular web 62 as it is being formed into a honeycomb block, a plurality of rods 68 having dual hexagonal segments are interposed in the spaces in the upper edge of the cellular web. Single hexagonal rods 70 are interposed in corresponding spaces formed at the lower edge of the cellular web. Thus, each of the sides of the cells formed in cellular web 62 is supported on both sides by a solid metal element. If cellular web 62 is to be bonded with adhesive, the rods 60, 68 and 70 support the sheet material as it is bonded. If sheet material is to be integrally bonded, rod 60, 68 and 70 support the material as it is being cured.

While preferred embodiments of the present invention have been illustrated in detail, it is apparent that modifications and adaptations of those embodiments will occur to those skilled in the art. For example, it may be possible to form the honeycomb structure of the present invention by creasing the material and then expanding it. However, it is to be expressly understood that such modifications and adaptations are within the sphere and scope of the present invention, as set forth in the following claims.

What I claim as new is:

1. A honeycomb structure formable into a non-planar contour comprising a cellular honeycomb web of thin sheet material, the cells of said web, except at the edges of said web, being substantially identical, each cell having a cross section consisting solely of three substantially congruent segments equally angularly disposed about a common axis, the cross section of each cell segment having a shape comprising four contiguous sides of a regular hexagonal configuration so that the intersections between said segments are non-linear to give flexibility to the structure.

2. A structure as recited in claim 1 wherein the sheet material comprises graphite yarn laminate.

3. A honeycomb structure formable into a non-planar contour comprising a cellular web of thin sheet material, the cells of said web, except at the edges of the web, being substantially identical, each said cell having a cross-section consisting solely of three substantially congruent segments equally angularly disposed about a common axis, each said congruent segment having a shape comprising four contiguous sides of a regular hexagonal configuration.

4. A flexible honeycomb comprising:
a plurality of corrugated strips of sheet material, each sheet having a cyclical cross section including in series two contiguous two-sided portions opening in a first direction joined to a four-sided portion opening in an opposite direction and having a single zenith, each side of said portions being of equal length, the respective strips of sheet material being overlaid so that the zeniths at the intersection between the two-sided portions of each sheet overlie the zeniths of the four-sided portions of the next adjacent sheet; and
means for bonding the sheets of material together to form a cellular honeycomb structure, each cell of said structure having a cross section comprising three substantially congruent segments equally angularly disposed about a common axis, each such segment having a shape comprising four contigiuous sides of a regular hexagonal configuration.

5. A honeycomb structure as recited in claim 4 wherein said bonding means comprises an adhesive applied to the nodes of the corrugated sheet material.

6. A honeycomb structure as recited in claim 4 wherein the bonding means comprises an integral bond formed between the strips of sheet material.

7. A honeycomb structure as recited in claim 4 wherein said sheet material comprises graphite yarn laminate.

8. A honeycomb structure comprising:
a plurality of tubular elements of thin sheet material, the cross section of said elements comprising three substantially congruent segments equally angularly disposed about a common axis, the cross section of each such segment having a shape comprising four contiguous sides of a regular hexagonal configuration, said tubular elements being stacked to form a cellular array of such material; and
means for bonding the stacked elements of sheet material together to form a flexible honeycomb structure.

9. A honeycomb structure as recited in claim 8 wherein each side of each tubular element, except at the edges of the honeycomb structure, is contiguous with a side of an adjacent tubular element.

10. A honeycomb structure as recited in claim 8 wherein the tubular elements are constructed of graphite yarn laminate.

* * * * *